(12) United States Patent
Sugita

(10) Patent No.: US 12,142,437 B2
(45) Date of Patent: Nov. 12, 2024

(54) MULTILAYER CERAMIC CAPACITOR

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 126 days.

(21) Appl. No.: 17/956,883

(22) Filed: Sep. 30, 2022

(65) Prior Publication Data

US 2023/0115608 A1   Apr. 13, 2023

(30) Foreign Application Priority Data

Oct. 11, 2021   (JP) ................................ 2021-167061

(51) Int. Cl.
| | |
|---|---|
| *H01G 4/30* | (2006.01) |
| *H01G 4/012* | (2006.01) |
| *H01G 4/12* | (2006.01) |
| *H01G 4/224* | (2006.01) |

(52) U.S. Cl.
CPC ............. *H01G 4/30* (2013.01); *H01G 4/012* (2013.01); *H01G 4/1227* (2013.01); *H01G 4/224* (2013.01)

(58) Field of Classification Search
CPC ........ H01G 4/30; H01G 4/012; H01G 4/1227; H01G 4/224
See application file for complete search history.

(56) References Cited

U.S. PATENT DOCUMENTS

| | | | | |
|---|---|---|---|---|
| 2011/0110014 | A1* | 5/2011 | Hirata ................... | H01G 4/005 |
| | | | | 156/89.12 |
| 2016/0196917 | A1* | 7/2016 | Lim ....................... | H01G 4/012 |
| | | | | 361/301.4 |
| 2019/0139704 | A1* | 5/2019 | Arai ........................ | H01G 4/12 |
| 2021/0104364 | A1* | 4/2021 | Okuda ................. | H01G 4/1218 |
| 2021/0142947 | A1* | 5/2021 | Teraoka ............... | H01G 4/1227 |
| 2022/0165496 | A1* | 5/2022 | Nishikori ................ | H01G 4/30 |

FOREIGN PATENT DOCUMENTS

| | | | |
|---|---|---|---|
| JP | 8-306580 A | | 11/1996 |
| KR | 20150016399 A | * | 2/2015 |

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body including laminated dielectric layers, first and second main surfaces, first and second end surfaces, and first and second side surfaces, first and second internal electrode layers on the dielectric layers and respectively exposed to the first and second end surfaces, and first and second external electrodes respectively on the first and second end surfaces. The multilayer body includes an effective layer portion in which the first and second internal electrode layers are opposite to each other, the effective layer portion includes inner and outer effective layer portions, and a coverage of the first and second internal electrode layers with respect to the dielectric layer in the outer effective layer portion is larger than a coverage of the first and second internal electrode layers with respect to the dielectric layer located in the inner effective layer portion.

18 Claims, 8 Drawing Sheets

II-II SECTION

IV-IV SECTION

IV-IV SECTION

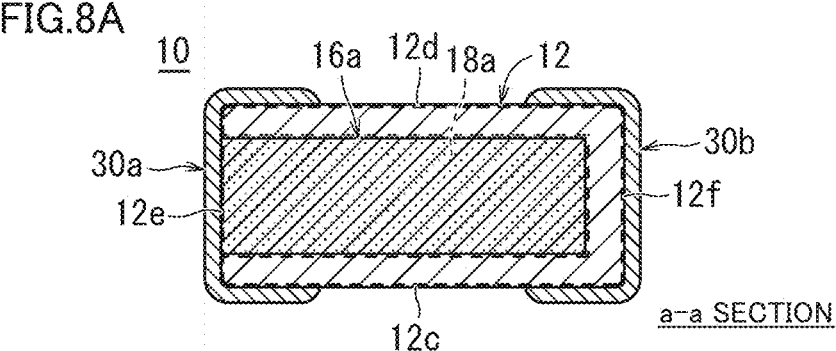
FIG.8A a-a SECTION
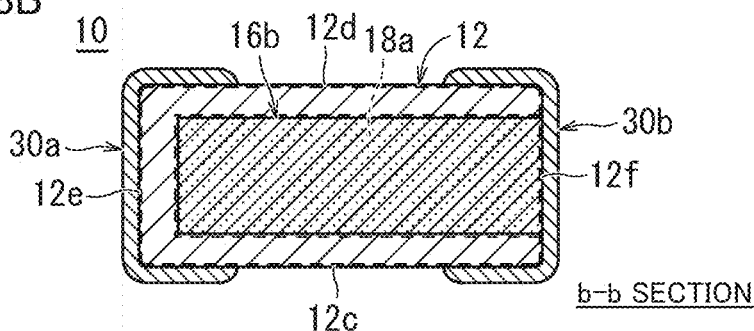
FIG.8B b-b SECTION
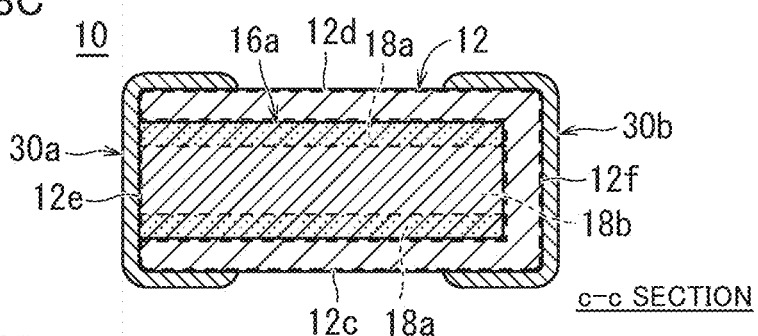
FIG.8C c-c SECTION
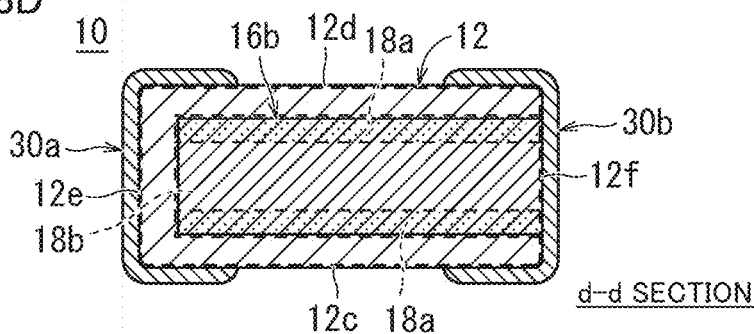
FIG.8D d-d SECTION

MULTILAYER CERAMIC CAPACITOR

CROSS REFERENCE TO RELATED APPLICATIONS

This application claims the benefit of priority to Japanese Patent Application No. 2021-167061 filed on Oct. 11, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, a multilayer ceramic capacitor is known. In general, a multilayer ceramic capacitor includes a ceramic sintered body made of a dielectric ceramic such as barium titanate. A plurality of internal electrodes are disposed inside the ceramic sintered body so as to overlap each other with a ceramic layer interposed therebetween. An external electrode is formed on one end surface of the ceramic sintered body so as to be electrically connected to the internal electrode, and an external electrode is formed on the other end surface so as to be electrically connected to the internal electrode (see, for example, Japanese Patent Laid No. 8-306580).

A multilayer ceramic capacitor as disclosed in Japanese Patent Laid-Open No. 8-306580 generally includes a pressing process of laminating and pressing a plurality of dielectric ceramic sheets on which an internal electrode paste is printed in a manufacturing process thereof. During the pressing process, the internal electrode paste flows by the pressure of pressing, and a portion in which a metal particle contained in the internal electrode paste is less overlapped in the thickness direction is generated at an end of the internal electrode paste.

When the dielectric ceramic on which the internal electrode paste is printed is fired in such a state, it is considered that the metal particle contained in the internal electrode paste shrinks during firing and tends to gather at one point, so that the internal electrode is interrupted after firing, thereby decreasing the coverage of the internal electrode with respect to the dielectric ceramic.

At this point, when the coverage of the internal electrode with respect to the dielectric ceramic is reduced at the end of the internal electrode, it is considered that a risk of moisture infiltration from the portion where the internal electrode is interrupted is increased to degrade the moisture resistance reliability of the multilayer ceramic capacitor.

In addition, it is considered that the coverage of the internal electrode with respect to the dielectric ceramic is reduced, thereby reducing the acquired electrostatic capacitance of the multilayer ceramic capacitor.

SUMMARY OF THE INVENTION

Preferred embodiments of the present invention provide multilayer ceramic capacitors that are each able to reduce or prevent a decrease in reliability of the multilayer ceramic capacitor due to a decrease in coverage of an internal electrode layer.

A multilayer ceramic capacitor according to a preferred embodiment of the present invention includes a multilayer body that includes a plurality of laminated dielectric layers, a first main surface and a second main surface facing each other in a height direction, a first end surface and a second end surface facing each other in a length direction orthogonal or substantially orthogonal to the height direction, and a first side surface and a second side surface facing each other in a width direction orthogonal or substantially orthogonal to the height direction and the length direction, a plurality of first internal electrode layers on the plurality of dielectric layers and exposed to the first end surface, a plurality of second internal electrode layers on the plurality of dielectric layers and exposed to the second end surface, a first external electrode the first end surface, and a second external electrode on the second end surface. The multilayer body includes an effective layer portion in which the first internal electrode layer and the second internal electrode layer are opposite to each other, and the effective layer portion includes an inner effective layer portion and an outer effective layer portion when viewed from the first end surface or the second end surface, the outer effective layer portion is located on sides of the first main surface, the second main surface, the first side surface, and the second side surface of the effective layer portion, and the inner effective layer portion is located inside the outer effective layer portion, and a coverage of the first internal electrode layer and the second internal electrode layer with respect to the dielectric layer located in the outer effective layer portion is larger than a coverage of the first internal electrode layer and the second internal electrode layer with respect to the dielectric layer located in the inner effective layer portion.

In a multilayer ceramic capacitor according to a preferred embodiment of the present invention described above, the coverage of the first internal electrode layer and the second internal electrode layer with respect to the dielectric layer located in the outer effective layer portion is larger than the coverage of the first internal electrode layer and the second internal electrode layer with respect to the dielectric layer located in the inner effective layer portion. Thus, the multilayer ceramic capacitor has a structure in which the coverage of the internal electrode layer with respect to the dielectric layer is larger in the outer effective layer portion of the effective layer portion into which the moisture or the like easily infiltrates than in the inner effective layer portion. Accordingly, an interrupted gap of the internal electrode layer defining and functioning as a moisture infiltration path can be reduced, so that infiltration of the moisture into the multilayer body can be reduced or prevented. As a result, moisture resistance reliability of the multilayer ceramic capacitor can be improved. In the outer effective layer portion of the effective layer portion, the coverage of the internal electrode layer with respect to the dielectric layer is large, so that the effective area can be improved to improve the electrostatic capacitance of the multilayer ceramic capacitor.

In a multilayer ceramic capacitor according to a preferred embodiment of the present invention described above, the coverage of the internal electrode layer with respect to the dielectric layer located in the inner effective layer portion is smaller than the coverage of the internal electrode layer with respect to the dielectric layer located in the outer effective layer portion. Accordingly, in the inner effective layer portion, the adhesion between the dielectric layer exposed without being covered with the internal electrode layer and the dielectric layer to be laminated thereon is improved, and the bonding force between the dielectric layers can be improved. As a result, the advantageous effect can also reduce or prevent peeling that can be generated between the dielectric layer and the internal electrode layer.

According to preferred embodiments of the present invention, multilayer ceramic capacitors that are each able to reduce or prevent a decrease in reliability of the multilayer ceramic capacitor due to a decrease in coverage of an internal electrode layer can be provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8A is a sectional view taken along a line VIIIA-VIIIA in FIG. 3, FIG. 8B is a sectional view taken along a line VIIIB-VIIIB in FIG. 3, FIG. 8C is a sectional view taken along a line VIIIC-VIIIC in FIG. 3, and FIG. 8D is a sectional view taken along a line VIIID-VIIID in FIG. 3.

DETAILED DESCRIPTION OF THE PREFERRED EMBODIMENTS

1. Multilayer Ceramic Capacitor

A multilayer ceramic capacitor according to a preferred embodiment of the present invention will be described with reference to the drawings.

Figure 1:
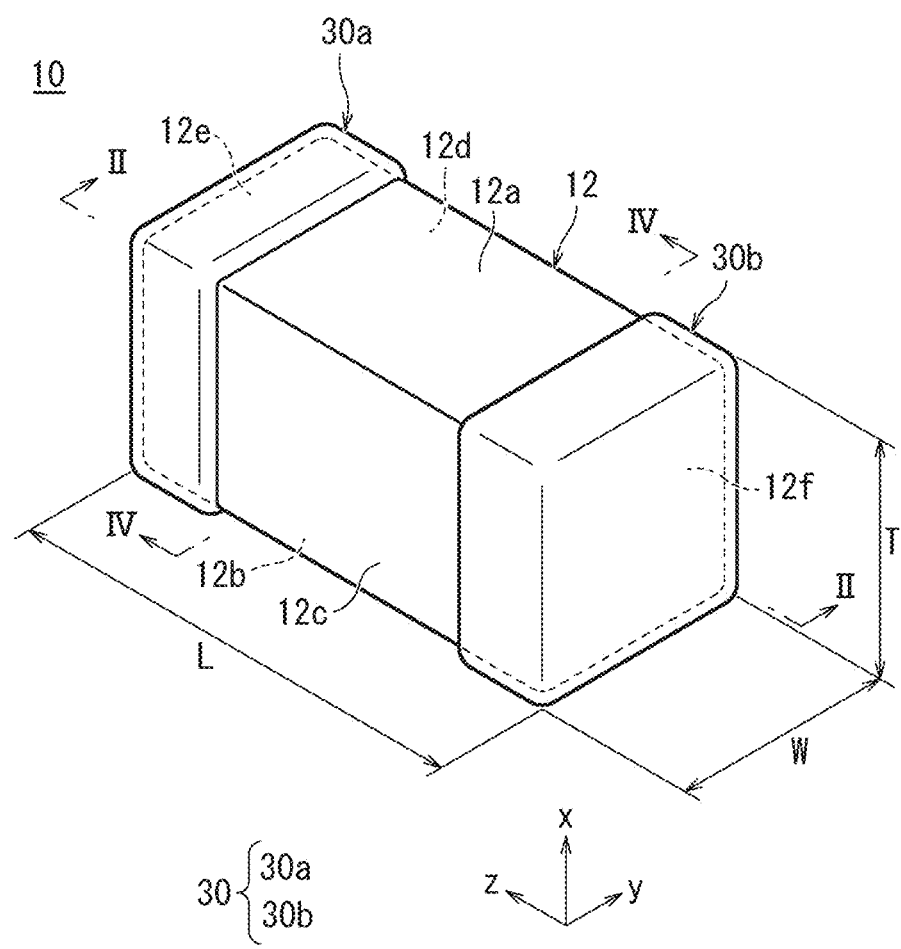
FIG. 1 is an external perspective view illustrating an example of a multilayer ceramic capacitor according to a preferred embodiment of the present invention.
Figure 2:
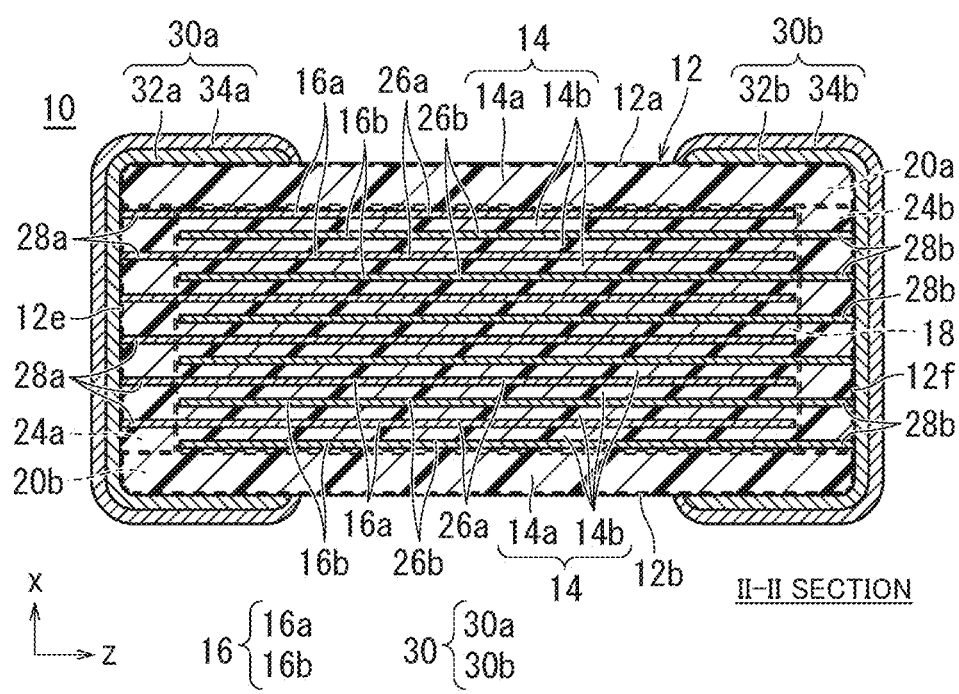
FIG. 2 is a sectional view taken along a line II-II in FIG. 1.
Figure 3:
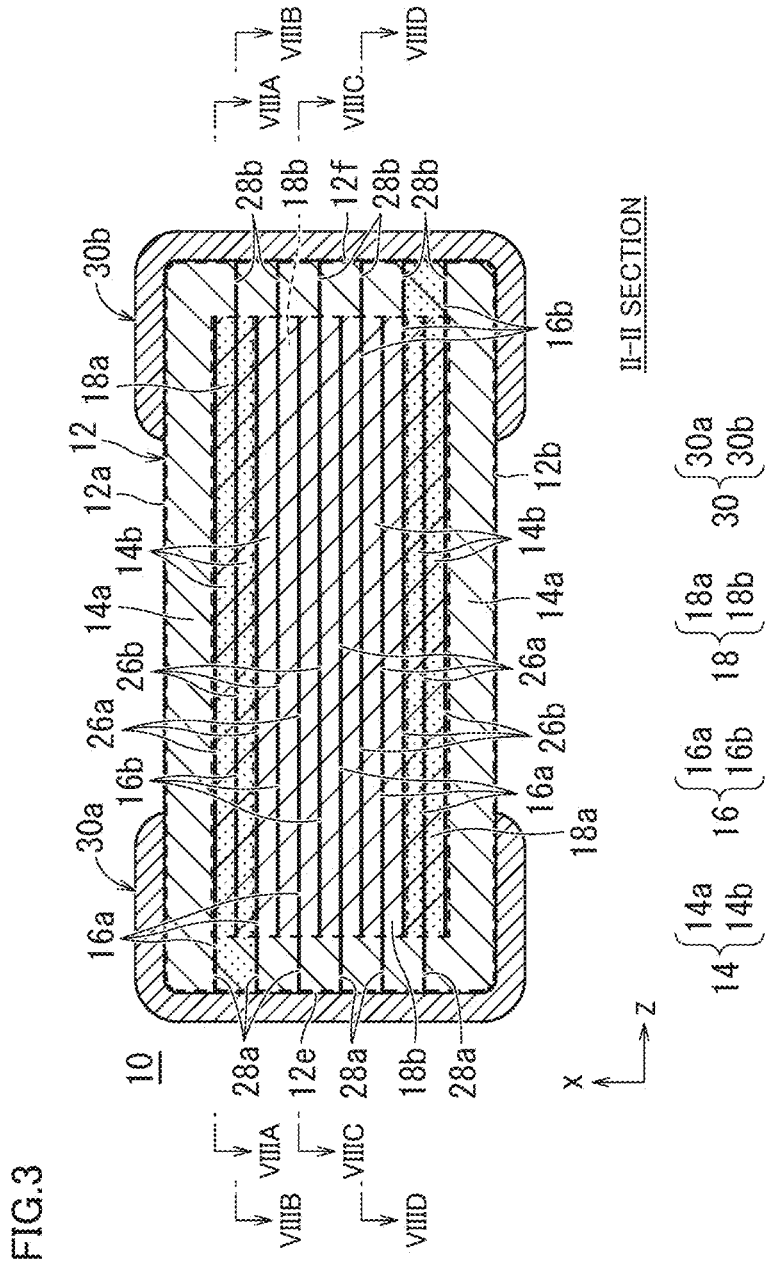
FIG. 3 is a sectional view schematically illustrating an outer effective layer portion and an inner effective layer portion in the line II-II in FIG. 1.
Figure 4:
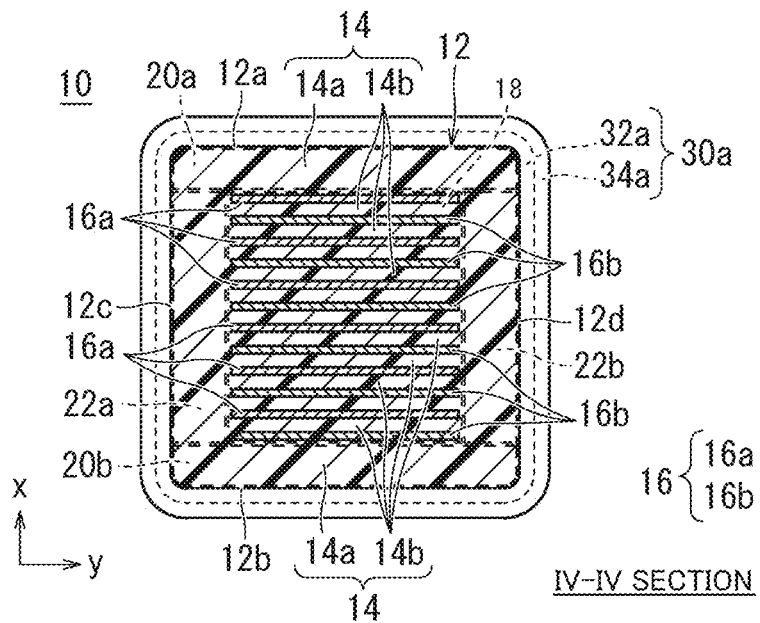
FIG. 4 is a sectional view taken along a line IV-IV in FIG. 1.
Figure 5:
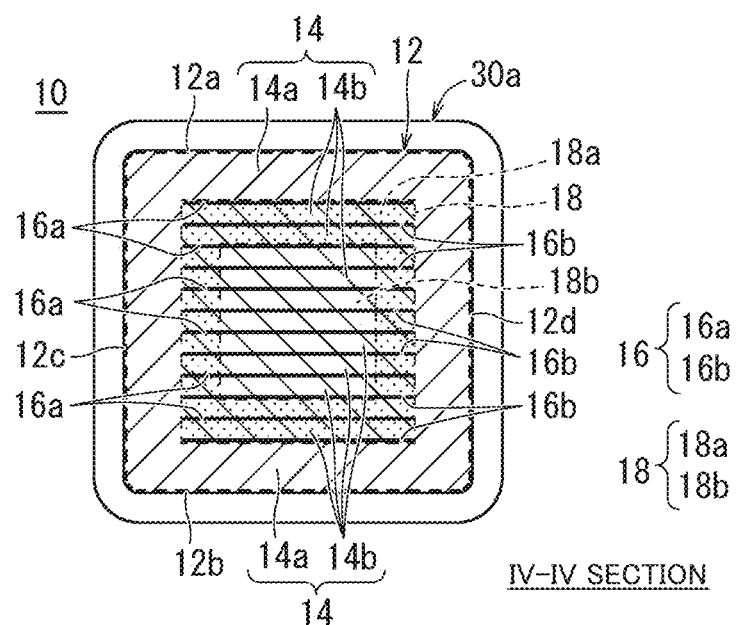
FIG. 5 is a sectional view schematically illustrating the outer effective layer portion and the inner effective layer portion in the line IV-IV in FIG. 1.

FIG. 1 is an external perspective view illustrating an example of a multilayer ceramic capacitor according to a preferred embodiment of the present invention. FIG. 2 is a sectional view taken along a line II-II in FIG. 1. FIG. 3 is a sectional view schematically illustrating an outer effective layer portion and an inner effective layer portion in the line II-II in FIG. 1. FIG. 4 is a sectional view taken along a line IV-IV in FIG. 1. FIG. 5 is a sectional view schematically illustrating the outer effective layer portion and the inner effective layer portion in the line IV-IV in FIG. 1.

As illustrated in FIG. 1, a multilayer ceramic capacitor 10 includes a rectangular or substantially rectangular parallelepiped multilayer body 12.

Multilayer body 12 includes a plurality of dielectric layers 14 and a plurality of internal electrode layers 16. Furthermore, multilayer body 12 includes a first main surface 12a and a second main surface 12b that face each other in a height direction x, a first side surface 12c and a second side surface 12d that face each other in a width direction y orthogonal or substantially orthogonal to height direction x, and a first end surface 12e and a second end surface 12f that face each other in a length direction z orthogonal or substantially orthogonal to height direction x and width direction y. In multilayer body 12, a corner and a ridge are rounded. The corner is a portion where three adjacent surfaces of the multilayer body intersect with one another, and the ridge is a portion where two adjacent surfaces of the multilayer body intersect with each other. Irregularities or the like may be provided on a portion or all of first main surface 12a and second main surface 12b, first side surface 12c and second side surface 12d, and first end surface 12e and second end surface 12f.

The number of dielectric layers 14 to be laminated is preferably, for example, greater than or equal to ten and less than or equal to one thousand five hundreds including an outer layer.

For example, dielectric layer 14 can be made of, for example, a dielectric material such as a ceramic material. For example, a dielectric ceramic including a component such as $BaTiO_3$, $CaTiO_3$, $SrTiO_3$, or $CaZrO_3$ can be used as such the dielectric material. When the dielectric material is included as a main component, for example, a material to which an accessory component having a content smaller than that of the main component such as, for example, an Mn compound, an Fe compound, a Cr compound, a Co compound, or an Ni compound is added may be used depending on the desired characteristic of multilayer body 12.

Preferably, the thickness of dielectric layer 14 after baking is, for example, greater than or equal to about 0.4 μm and less than or equal to about 10.0 μm.

Multilayer body 12 includes an effective layer portion 18 including one or a plurality of dielectric layers 14b and a plurality of internal electrode layers 16 disposed thereon. In the effective layer portion 18, the plurality of internal electrode layers 16 are opposite to each other.

Multilayer body 12 includes a first main surface-side outer layer 20a that is located on the side of first main surface 12a and includes a plurality of dielectric layers 14a located between first main surface 12a, and an outermost surface of effective layer portion 18 on the side of first main surface 12a and a plane extending from the outermost surface.

Similarly, multilayer body 12 includes a second main surface-side outer layer 20b that is located on the side of second main surface 12b and includes a plurality of dielectric layers 14a located between second main surface 12b, and the outermost surface of effective layer portion 18 on the side of second main surface 12b and a plane extending from the outermost surface.

Multilayer body 12 includes a first side surface-side outer layer 22a that is located on the side of first side surface 12c and includes the plurality of dielectric layers 14b located between first side surface 12c and an outermost surface of effective layer portion 18 on the side of first side surface 12c.

Similarly, multilayer body 12 includes a second side surface-side outer layer 22b that is located on the side of second side surface 12d and includes the plurality of dielectric layers 14b located between second side surface 12d and the outermost surface of effective layer portion 18 on the side of second side surface 12d.

Multilayer body 12 includes a first end surface-side outer layer 24a that is located on the side of first end surface 12e and includes the plurality of dielectric layers 14b located between first end surface 12e and the outermost surface of effective layer portion 18 on the side of first end surface 12e.

Similarly, multilayer body 12 includes a second end surface-side outer layer 24b that is located on the second end surface 12f side and includes the plurality of dielectric layers 14b located between second end surface 12f and the outermost surface of effective layer portion 18 on the side of second end surface 12f.

As illustrated in FIG. 5, effective layer portion 18 includes an outer effective layer portion 18a and an inner effective layer portion 18b when viewed from the side of first end surface 12e or the side of second end surface 12f.

Outer effective layer portion 18a is a region of effective layer portion 18, the region entering a predetermined range inward from at least edge ends on the side of first main surface 12a, the side of second main surface 12b, the side of first side surface 12c, and the side of second side surface 12d.

Inner effective layer portion 18b is a region inside outer effective layer portion 18a in effective layer portion 18.

A coverage A of internal electrode layer 16 with respect to dielectric layer 14 located in outer effective layer portion 18a is larger than a coverage B of internal electrode layer 16 with respect to dielectric layer 14 located in inner effective layer portion 18b.

Coverage A of internal electrode layer 16 with respect to dielectric layer 14 located in outer effective layer portion 18a is preferably, for example, greater than or equal to about 85% and less than or equal to about 100%. Coverage B of internal electrode layer 16 with respect to dielectric layer 14 located in inner effective layer portion 18b is preferably, for example, greater than or equal to about 70% and less than or equal to about 80%. As a result, a gap between internal electrode layers 16 of outer effective layer portion 18a into which moisture easily enters can be reduced, so that the entry of the moisture into multilayer body 12 can be prevented. Accordingly, the advantageous effect of further improving the moisture resistance reliability of multilayer ceramic capacitor 10 can be obtained. In addition, by making coverage B with respect to dielectric layer 14 located in inner effective layer portion 18b smaller than coverage A of internal electrode layer 16 with respect to dielectric layer 14 located in outer effective layer portion 18a, in inner effective layer portion 18b, the adhesion between dielectric layer 14 exposed without being covered with internal electrode layer 16 and another dielectric layer 14 to be laminated thereon is further improved, and the bonding force between dielectric layers 14 can be increased. As a result, the advantageous effect can be further provided against the problem of peeling that can be generated between dielectric layer 14 and internal electrode layer 16.

Here, when coverage A of internal electrode layers 16 with respect to dielectric layers 14 located in outer effective layer portions 18a is less than about 85%, the infiltration of the moisture into multilayer body 12 cannot be sufficiently reduced or prevented, the effective area is also reduced, and the acquired electrostatic capacitance of the multilayer ceramic capacitor cannot be improved.

When coverage B of internal electrode layers 16 with respect to dielectric layers 14 located in inner effective layer portions 18b is less than about 70%, the effective area is reduced, and sometimes the intended electrostatic capacitance of the multilayer ceramic capacitor is not obtained.

Furthermore, when coverage B of internal electrode layer 16 with respect to dielectric layer 14 located in inner effective layer portion 18b is more than about 80%, it is considered that, in inner effective layer portion 18b, the adhesion between dielectric layer 14 exposed without being covered with internal electrode layer 16 and another dielectric layer 14 to be laminated thereon is reduced, and the bonding force between dielectric layers 14 is weakened. As a result, sometimes the peeling is generated between dielectric layer 14 and internal electrode layer 16.

Outer effective layer portion 18a is preferably a portion from the edge end of effective layer portion 18 to a portion entering the inside by, for example, about 20 μm. More specifically, outer effective layer portion 18a refers to a region from each of the edge ends of effective layer portion 18 on the side of first main surface 12a, the side of second main surface 12b, the side of first side surface 12c, and the side of second side surface 12d to a portion entering the inside by about 20 μm. As a result, a region of coverage A of internal electrode layers 16 with respect to dielectric layers 14 located in outer effective layer portions 18a required for multilayer ceramic capacitor 10 can be secured, and the advantageous effect of preferred embodiments of the present invention can be ensured.

It is considered that when outer effective layer portion 18a exceeds about 20 μm from the edge end of effective layer portion 18, in inner effective layer portion 18b, the adhesion between dielectric layer 14 exposed without being covered with internal electrode layer 16 and another dielectric layer 14 to be laminated thereon is reduced, and the bonding force between dielectric layers 14 is weakened. As a result, sometimes the peeling is generated between dielectric layer 14 and internal electrode layer 16.

A non-limiting example of a method for measuring the coverage of internal electrode layer 16 with respect to dielectric layer 14 will be described below.

Method for Measuring Coverage A of Internal Electrode Layer with Respect to Dielectric Layer Located in Outer Effective Layer Portion Coverage A of internal electrode layer 16 with respect to dielectric layer 14 located in outer effective layer portion 18a is measured by the method described below, for example.

That is, first, multilayer ceramic capacitor 10 is polished in section from first end face 12e or second end face 12f to a position of about ½ of the L dimension to expose a specific WT section.

Figure 6:
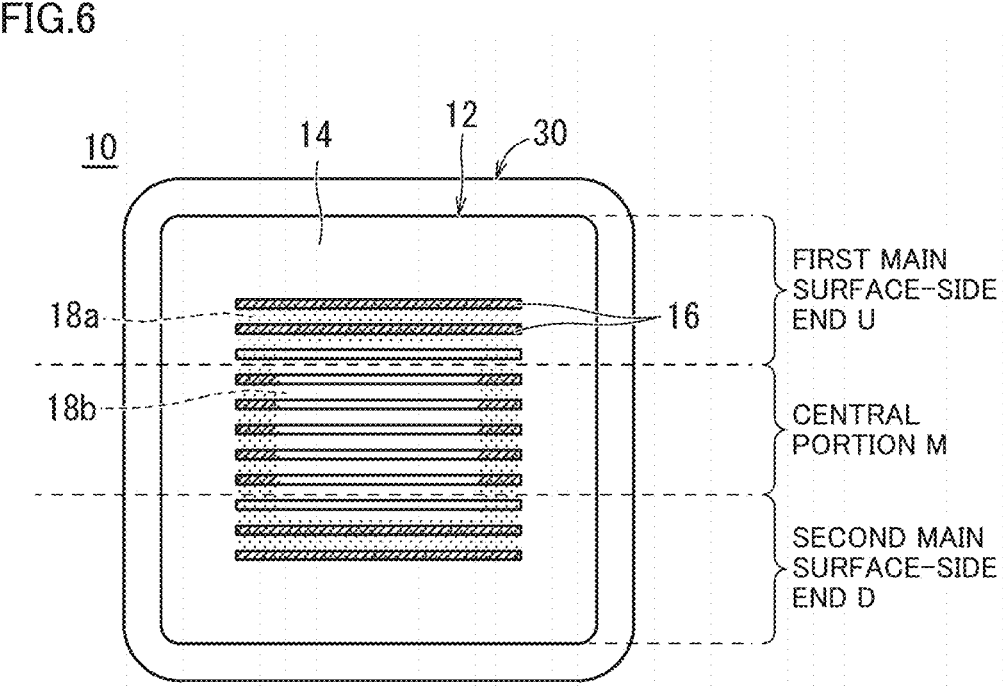
FIG. 6 is a sectional view schematically illustrating a region calculating coverage of an internal electrode layer with respect to a dielectric layer located in the outside effective layer portion.

Subsequently, as illustrated in FIG. 6, in the WT section of multilayer ceramic capacitor 10 exposed by polishing, multilayer body 12 is divided into three equal or substantially equal portions at a height that is a laminating direction, namely, a central portion M, a first main surface-side end U, and a second main surface-side end D. Internal electrode layers 16 located at outer effective layer portions 18a at first main surface-side end U and second main surface-side end D, and internal electrode layers 16 located at outer effective layer portions 18a at central portion M are observed with a scanning electron microscope (SEM) or a metal microscope.

Thereafter, an arbitrary ten internal electrode layers 16 are specified in three observation regions of central portion M, first main surface-side end U, and second main surface-side end D, and the length in width direction y that becomes the analysis target range, and the length in width direction y where internal electrode layer 16 actually exists are measured, and coverage A of internal electrode layer 16 with respect to dielectric layer 14 located in outer effective layer portion 18a is calculated by the following equation (1). The length in width direction y that is the analysis target range is a length including a void of internal electrode layer 16, and the length in width direction y in which internal electrode layer 16 exists is an actual length of internal electrode layer 16 excluding the void.

$$\text{coverage (\%)} = (\text{length of internal electrode layer 16 in width direction y/length of analysis target range in width direction y}) \times 100 \quad (1)$$

Regarding the length in width direction y to be the analysis target range in central portion M and the length in width direction y in which internal electrode layer 16 exists, outer effective layer portion 18a on the side of first side surface 12c and the side of second side surface 12d that exist on the same straight line are specified as one internal electrode layer 16.

Finally, the average value of the values of thirty coverages calculated in three observation regions of central portion M, first main surface-side end U, and second main surface-side end D is defined as coverage A of internal electrode layer 16 with respect to dielectric layer 14 located in outer effective layer portion 18a.

Method for measuring Coverage B of Internal Electrode Layer with Respect to Dielectric Layer located in Inner Effective Layer Portion Coverage B of internal electrode layer 16 with respect to dielectric layer 14 located in inner effective layer portion 18b is measured by the method described below, for example.

That is, first, multilayer ceramic capacitor 10 is polished in section from first end surface 12e or second end surface 12f to a position of about ½ of the L dimension to expose a specific WT section.

Figure 7:
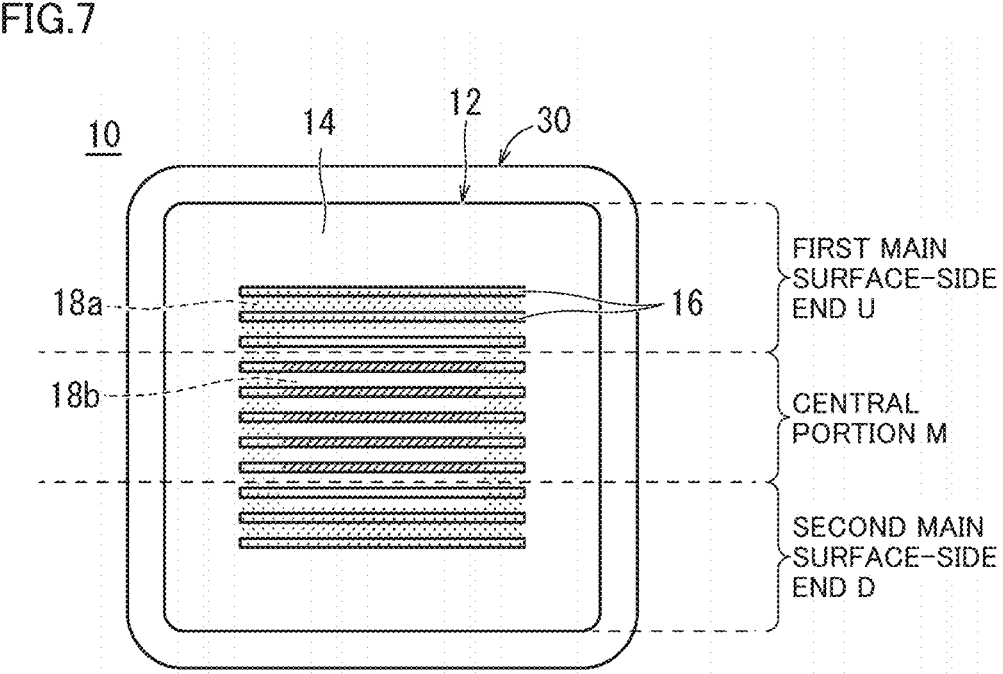
FIG. 7 is a sectional view schematically illustrating a region calculating the coverage of the internal electrode layer with respect to the dielectric layer located in the inner effective layer portion.

Subsequently, as illustrated in FIG. 7, in the WT section of multilayer ceramic capacitor 10 exposed by polishing, multilayer body 12 is divided into three equal portions at a height that is a laminating direction, namely, a central portion M, a first main surface-side end U, and a second main surface-side end D. Internal electrode layers 16 located at inner effective layer portions 18b at central portion M are observed with the scanning electron microscope (SEM) or the metal microscope.

Thereafter, in the observation region of central portion M, an arbitrary ten internal electrode layers 16 are specified, the length in width direction y that becomes the analysis target range and the length in width direction y where internal electrode layer 16 actually exists are measured, and coverage B of internal electrode layer 16 with respect to dielectric layer 14 located in inner effective layer portion 18b is calculated by the above equation (1). The length in width direction y that is the analysis target range is a length including a void of internal electrode layer 16, and the length in width direction y in which internal electrode layer 16 exists is an actual length of internal electrode layer 16 excluding the void.

Finally, the average value of the ten coverage values calculated in the observation region of central portion M is defined as coverage B of internal electrode layer 16 with respect to dielectric layer 14 located in inner effective layer portion 18b.

For example, multilayer body 12 includes a plurality of first internal electrode layers 16a and a plurality of second internal electrode layers 16b having a rectangular or substantially rectangular shape as the plurality of internal electrode layers 16. The plurality of first internal electrode layers 16a and the plurality of second internal electrode layers 16b are embedded so as to be alternately arranged at equal or substantially equal intervals with dielectric layer 14 interposed therebetween along height direction x of multilayer body 12.

First internal electrode layer 16a includes a first counter electrode 26a facing second internal electrode layer 16b and a first extracting electrode 28a located on one end side of first internal electrode layer 16a and extending from first counter electrode 26a to first end surface 12e of multilayer body 12. An end of first extracting electrode 28a is extracted to first end surface 12e and exposed.

Second internal electrode layer 16b includes a second counter electrode 26b that faces first internal electrode layer 16a and a second extracting electrode 28b that is located on one end side of second internal electrode layer 16b and extends from second counter electrode 26b to second end surface 12f of multilayer body 12. The end of second extracting electrode 28b is extracted to second end surface 12f and exposed.

At this point, when first internal electrode layers 16a located in outer effective layer portions 18a located on both end sides in the lamination direction are viewed from planar view (LW surface), as illustrated in FIG. 8A, coverage A of first internal electrode layers 16a with respect to dielectric layers 14 is large over the entire surface of first internal electrode layers 16a. When second internal electrode layers 16b located in outer effective layer portions 18a located on both end sides in the laminating direction are viewed from planar view (LW surface), as illustrated in FIG. 8B, coverage A of second internal electrode layer 16b with respect to dielectric layer 14 is large over the entire surface of second internal electrode layer 16b. Coverage A of first internal electrode layer 16a and second internal electrode layer 16b with respect to dielectric layers 14 located in outer effective layer portions 18a located on both end sides in the lamination direction is preferably, for example, greater than or equal to about 85% and less than or equal to about 100%. Thus, for example, the formation of different phases (Mg—Si—Ni) of all solid solutions generated by the solid solution of NiO as an oxide of the internal electrode, MgO as an additive, and SiO$_2$ as glass in internal electrode layers 16 located outermost can be prevented in the lamination direction of effective layer portion 18. By preventing the formation of different phases, the decrease in the thickness of internal electrode layers 16 located on the outer side in the lamination direction of effective layer portion 18 can be reduced or prevented, and the advantageous effect of reducing or preventing a short circuit defect can be obtained.

When first internal electrode layer 16a is planarly viewed (LW surface) so as to include a portion other than outer effective layer portion 18a located in the lamination direction, as illustrated in FIG. 8C, only both ends of first internal electrode layer 16a in width direction y become regions of outer effective layer portion 18a, and other regions become regions of inner effective layer portion 18b. When second internal electrode layer 16b is planarly viewed (LW surface) so as to include a portion other than outer effective layer portion 18a located in the lamination direction, as illustrated in FIG. 8D, only both ends of second internal electrode layer 16b in width direction y become regions of outer effective layer portion 18a, and other regions become regions of inner effective layer portion 18b. Coverage A of outer effective layer portion 18a located only at both ends in width direction y of first internal electrode layer 16a and second internal electrode layer 16b is preferably, for example, greater than or equal to about 85% and less than or equal to about 100%, and coverage B of inner effective layer portion 18b is preferably greater than or equal to about 70% and less than or equal to about 80%. Thus, by making coverage B of internal electrode layer 16 with respect to dielectric layer 14 located in inner effective layer portion 18b smaller than coverage A of internal electrode layer 16 with respect to dielectric layer 14 located in outer effective layer portion 18a, in inner effective layer portion 18b, the adhesion between dielectric layer 14 exposed without being covered with internal electrode layer 16 and another dielectric layer 14 to be laminated thereon is improved, and the bonding force between dielectric layers 14 can be increased. As a result, the advantageous effect can also be provided on the problem of peeling that can be generated between dielectric layer 14 and internal electrode layer 16.

Figure 9A:
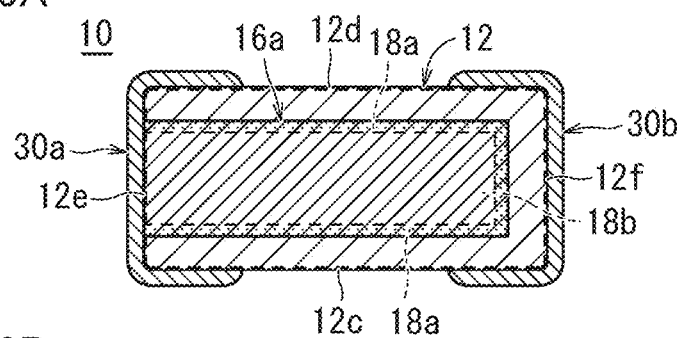
FIG. 9A is a sectional view illustrating a modification of a first internal electrode layer in FIG. 8B.
Figure 9B:
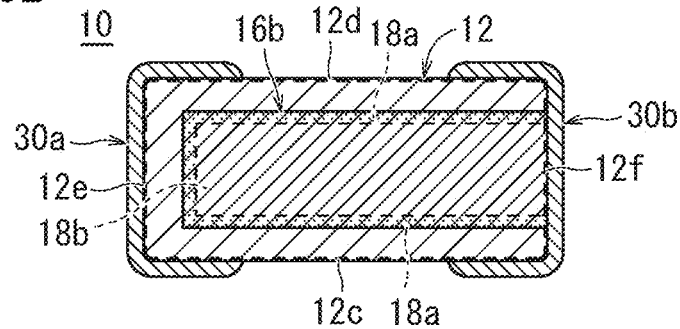
FIG. 9B is a sectional view illustrating a modification of a second internal electrode layer in FIG. 8C.

As illustrated in FIG. 9A, a portion having high coverage A may be provided such that outer effective layer portion 18a is also located at the end opposite to the surface extended to first end surface 12e in first internal electrode layer 16a. In addition, as illustrated in FIG. 9B, a portion having high coverage A may be provided such that outer effective layer portion 18a is also located at an end opposite to the surface extended to second end surface 12f in second internal electrode layer 16b. Thus, in a normal multilayer ceramic capacitor, in outer effective layer portion 18a of effective layer portion 18 in which the coverage of internal electrode layer 16 with respect to dielectric layer 14 is likely to decrease, a structure in which the coverage of internal electrode layer 16 with respect to dielectric layer 14 is large can be used, so that the effective area can be improved to improve the electrostatic capacitance of the multilayer ceramic capacitor.

A shape of first counter electrode 26a of first internal electrode layer 16a is not particularly limited, but is preferably, for example, rectangular or substantially rectangular in planar view. However, the corner may be rounded in planar view, or structured obliquely in planar view (tapered). In addition, the corner may have a tapered shape in planar view in which an inclination is in either direction.

The shape of first extracting electrode 28a of first internal electrode layer 16a is not particularly limited, but is preferably, for example, rectangular or substantially rectangular in planar view. However, the corner may be rounded in planar view, or structured obliquely in planar view (tapered). In addition, the corner may have a tapered shape in planar view in which an inclination is in either direction.

A width of first counter electrode 26a of first internal electrode layer 16a and a width of first extracting electrode 28a of first internal electrode layer 16a may be the same or substantially the same, or either one of the widths may be narrower.

The shape of second counter electrode 26b of the second internal electrode layer 16b is not particularly limited, but is preferably, for example, rectangular or substantially rectangular in planar view. However, the corner may be rounded in planar view, or structured obliquely in planar view (tapered). In addition, the corner may have a tapered shape in planar view in which an inclination is in either direction.

The shape of second extracting electrode 28b of second internal electrode layer 16b is not particularly limited, but is preferably, for example, rectangular or substantially rectangular in planar view. However, the corner may be rounded in planar view, or structured obliquely in planar view (tapered). In addition, the corner may have a tapered shape in planar view in which an inclination is in either direction.

The width of second counter electrode 26b of the second internal electrode layer 16b and the width of second extracting electrode 28b of second internal electrode layer 16b may be the same or substantially the same, or either one of the widths may be narrower.

First internal electrode layer 16a and second internal electrode layer 16b can be made of an appropriate conductive material such as, for example, a metal such as Ni, Cu, Ag, Pd, or Au, or an alloy, such as, for example, an Ag—Pd alloy, including at least one of these metals.

The thickness of each of internal electrode layers 16, namely, first internal electrode layers 16a and second internal electrode layers 16b is preferably, for example, greater than or equal to about 0.2 μm and less than or equal to about 5.0 μm.

The numbers of first internal electrode layers 16a and second internal electrode layers 16b are preferably, for example, greater than or equal to 10 and less than or equal to 1500 in total.

Sn may be disposed at the interface between first internal electrode layer 16a and dielectric layer 14 and the interface between second internal electrode layer 16b and dielectric layer 14.

Sn may be layered or scattered.

Sn may be solid-solved in the side of internal electrode layer 16 or may be solid-solved in the dielectric grain on the side of dielectric layer 14.

As illustrated in FIG. 1, external electrode 30 is disposed on the side of first end surface 12e and the side of second end surface 12f of multilayer body 12.

External electrode 30 includes a first external electrode 30a and a second external electrode 30b.

First external electrode 30a is connected to first internal electrode layer 16a and disposed on the surface of first end surface 12e. In addition, first external electrode 30a extends from first end surface 12e and may be disposed on a portion of first main surface 12a and a portion of second main surface 12b and a portion of first side surface 12c and a portion of second side surface 12d. In this case, first external electrode 30a is electrically connected to first extracting electrode 28a of first internal electrode layer 16a.

Second external electrode 30b is connected to second internal electrode layer 16b and disposed on the surface of second end surface 12f. Second external electrode 30b extends from second end surface 12f and may be disposed on a portion of first main surface 12a and a portion of second main surface 12b and a portion of first side surface 12c and a portion of second side surface 12d. In this case, second external electrode 30b is electrically connected to second extracting electrode 28b of second internal electrode layer 16b.

In multilayer body 12, first counter electrode 26a of first internal electrode layer 16a and second counter electrode 26b of second internal electrode layer 16b face each other with dielectric layer 14 interposed therebetween, thus generating electrostatic capacitance. For this reason, the electrostatic capacitance can be obtained between first external electrode 30a to which first internal electrode layer 16a is connected and second external electrode 30b to which second internal electrode layer 16b is connected, and the characteristic of the capacitor is exhibited.

Figure 10A:
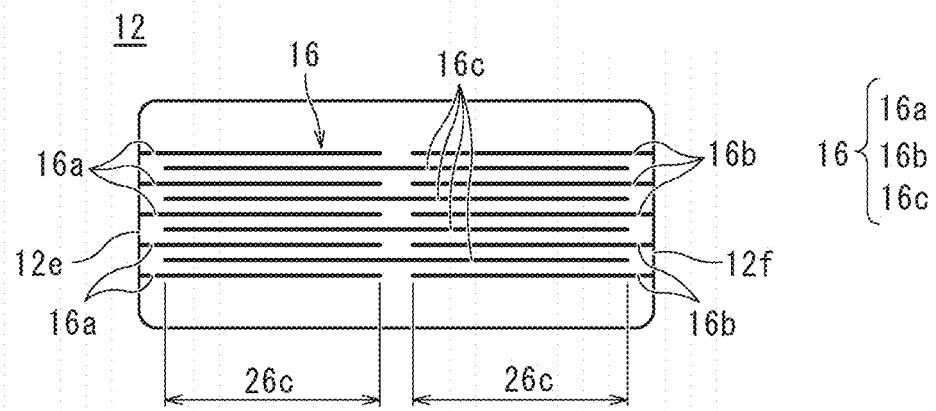
FIG. 10A is a sectional view taken along a line III-III in FIG. 1 illustrating a structure in which a counter electrode portion of an internal electrode layer of a multilayer ceramic capacitor according to a preferred embodiment of the present invention is divided into two.
Figure 10B:
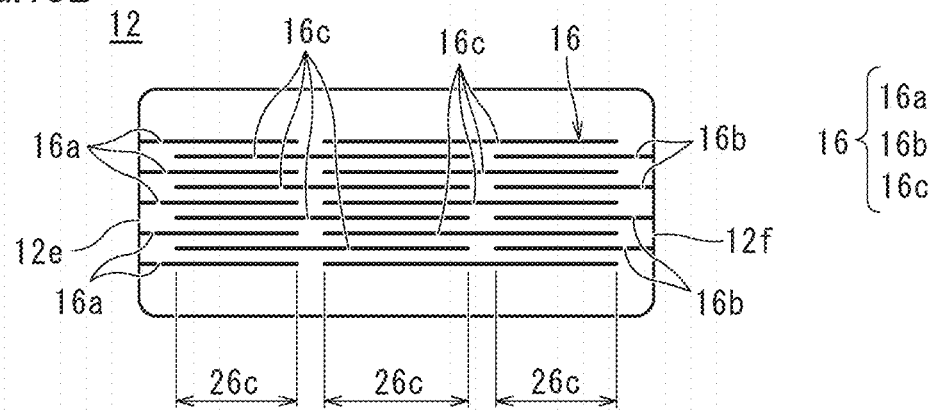
FIG. 10B is a sectional view taken along the line III-III in FIG. 1 illustrating a structure in which a counter electrode portion of an internal electrode layer of a multilayer ceramic capacitor according to a preferred embodiment of the present invention is divided into three.
Figure 10C:
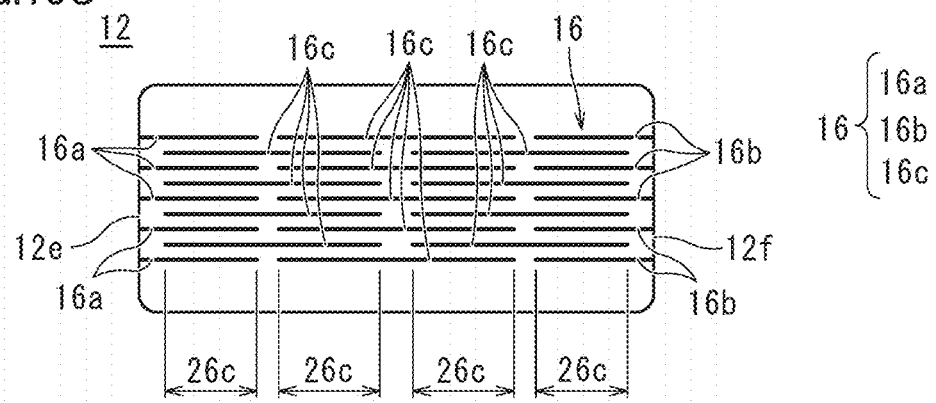
FIG. 10C is a sectional view taken along the line III-III in FIG. 1 illustrating a structure in which a counter electrode portion of an internal electrode layer of a multilayer ceramic capacitor according to a preferred embodiment of the present invention is divided into four.

As illustrated in FIGS. 10A to 10C, internal electrode layer 16 may have a structure in which, in addition to first internal electrode layer 16a and second internal electrode layer 16b, a floating internal electrode layer 16c that is not extended to either first end surface 12e or second end surface 12f is provided, and counter electrode 18c is divided into a plurality of portions by floating internal electrode layer 16c. For example, a double structure in FIG. 10A, a triple structure in FIG. 10B, and a quadruple structure in FIG. 10C, and a structure at least four may be provided. In this way, by having a structure in which counter electrode 18c is divided into the plurality of portions, a plurality of capacitor components are provided among opposing internal electrode layers 16a, 16b, 16c, and these capacitor components are connected in series. For this reason, the voltage applied to each capacitor component decreases, and a withstand voltage of the multilayer ceramic capacitor can be increased.

External electrode 30 includes a ground electrode layer 32 including a metal component and a glass component and a plating layer 34 provided on the surface of ground electrode layer 32.

Ground electrode layer 32 includes a first ground electrode layer 32a and a second ground electrode layer 32b.

First ground electrode layer 32a is disposed on the surface of first end surface 12e of multilayer body 12, and extends from first end surface 12e and covers a portion of each of first main surface 12a, second main surface 12b, first side surface 12c, and second side surface 12d.

Second ground electrode layer 32b is disposed on the surface of second end surface 12f of multilayer body 12, and extends from second end surface 12f and covers a portion of each of first main surface 12a, second main surface 12b, first side surface 12c, and second side surface 12d.

First ground electrode layer 32a may be disposed only on the surface of first end surface 12e of multilayer body 12, and second ground electrode layer 32b may be disposed only on the surface of second end surface 12f of multilayer body 12.

Ground electrode layer 32 includes, for example, at least one selected from a baked layer, a conductive resin layer, a thin film layer, and the like.

Each configuration in the case where ground electrode layer 32 is the baked layer, the conductive resin layer, or the thin film layer will be described below.

The baked layer includes a glass component and a metal component. The glass component of the baked layer includes, for example, at least one selected from B, Si, Ba, Mg, Al, Li, and the like. For example, the metal component of the baked layer includes at least one selected from Cu, Ni, Ag, Pd, an Ag—Pd alloy, Au, and the like. The baked layer is obtained by applying a conductive paste including the glass component and the metal component to multilayer body 12. The baked layer may be formed by simultaneously baking a multilayer chip including internal electrode layers 16 and dielectric layers 14 and a conductive paste applied to the multilayer chip, or formed by baking the multilayer chip including internal electrode layers 16 and dielectric layers 14 to obtain the multilayer body and then baking a conductive paste to the multilayer body. When the multilayer chip including internal electrode layer 16 and dielectric layer 14 as the baked layer and the conductive paste applied to the multilayer chip are simultaneously baked, the baked layer is preferably formed by baking a layer obtained by adding a ceramic component instead of a glass component. The baked layer may include a plurality of layers.

When ground electrode layer 32 includes the ceramic component instead of the glass component, the adhesion between multilayer body 12 and ground electrode layer 32 can be improved. Ground electrode layer 32 may include both the glass component and the ceramic component.

As the ceramic component included in ground electrode layer 32, the same type of ceramic material as that of dielectric layer 14 may be used, or a different type of ceramic material may be used. For example, the ceramic component includes at least one selected from $BaTiO_3$, $CaTiO_3$, $(Ba,Ca)TiO_3$, $SrTiO_3$, and $CaZrO_3$.

When first ground electrode layer 32a is a baked layer, for example, the thickness of first ground electrode layer 32a located on first end face 12e at the central portion in height direction x is preferably greater than or equal to about 3 μm and less than or equal to about 160 μm.

When second ground electrode layer 32b is a baked layer, for example, the thickness of second ground electrode layer 32b located on second end face 12f at the central portion in height direction x is preferably greater than or equal to about 3 μm and less than or equal to about 160 μm.

When ground electrode layer 32 is provided by a baking layer on first main surface 12a and second main surface 12b, the thickness in the direction connecting first main surface 12a and second main surface 12b at the central portion in length direction z of first ground electrode layer 32a located on first main surface 12a and second main surface 12b is preferably, for example, greater than or equal to about 3 μm and less than or equal to about 40 μm, and the thickness in the direction connecting first main surface 12a and second main surface 12b at the central portion in length direction z of second ground electrode layer 32b located on first main plane 12a and second main surface 12b is preferably, for example, greater than or equal to about 3 μm and less than or equal to about 40 μm.

Furthermore, when ground electrode layer 32 is provided by the baking layer on first side surface 12c and second side surface 12d, the thickness in the direction connecting first side surface 12c and second side surface 12d at the central portion in length direction z of first ground electrode layer 32a located on first side surface 12c and second side surface 12d is preferably, for example, greater than or equal to about 3 μm and less than or equal to about 40 μm, and the thickness in the direction connecting first side surface 12c and second side surface 12d at the central portion in length direction z of second ground electrode layer 32b located on first side surface 12c and second side surface 12d is preferably, for example, greater than or equal to about 3 μm and less than or equal to about 40 μm.

When the conductive resin layer is provided as ground electrode layer 32, the conductive resin layer may be disposed on the baked layer so as to cover the baked layer, or directly disposed on the multilayer body 12.

The conductive resin layer includes, for example, metal and a thermosetting resin.

The conductive resin layer may completely cover ground electrode layer, or cover a portion of ground electrode layer.

Because the conductive resin layer includes the thermosetting resin, the conductive resin layer is more flexible than a conductive layer formed of, for example, a plated film or a fired product of a conductive paste. For this reason, even when impact caused by a physical impact or a thermal cycle is applied to multilayer ceramic capacitor 10, the conductive resin layer can define and function as a buffer layer to prevent the crack in multilayer ceramic capacitor 10.

For example, Ag, Cu, Ni, Sn, Bi, or an alloy including them can be used as the metal included in the conductive resin layer.

In addition, for example, metal powder in which the surface of the metal powder is coated with Ag can also be used. When an Ag-coated metal powder is used, Cu, Ni, Sn, Bi, or an alloy powder thereof is preferably used as the metal powder. The reason for using the conductive metal powder of Ag as the conductive metal is that Ag has the lowest specific resistance among metals and thus is suitable as an electrode material, and that Ag is not oxidized and has high weather resistance because Ag is a noble metal. In addition, this is because the metal of the base material can be made inexpensively while the characteristics of Ag are maintained.

Furthermore, for example, the metal obtained by subjecting Cu, Ni to an oxidation preventing treatment can also be used as the metal included in the conductive resin layer.

The metal powder obtained by coating the surface of the metal powder with, for example, Sn, Ni, Cu can also be used as the metal included in the conductive resin layer. When the metal powder coated with, for example, Sn, Ni, Cu is used, Ag, Cu, Ni, Sn, Bi, or an alloy powder thereof is preferably used as the metal powder.

The metal included in the conductive resin layer is preferably included, for example, in an amount greater than or equal to about 35 vol % and less than or equal to about 75 vol % with respect to the volume of the entire conductive resin.

The average particle diameter of the metal included in the conductive resin layer is not particularly limited. For example, the average particle size of the conductive filler may be about greater than or equal to about 0.3 μm and less than or equal to about 10 μm.

The metal included in the conductive resin layer is mainly responsible for the conductivity of the conductive resin layer. When conductive fillers come into contact with each other, an energization path is provided inside the conductive resin layer.

As the metal included in the conductive resin layer, for example, a spherical metal powder or a flat metal powder can be used, but a mixture of the spherical metal powder and the flat metal powder is preferably used.

For example, known various thermosetting resins such as an epoxy resin, a phenoxy resin, a phenol resin, a urethane resin, a silicone resin, and a polyimide resin can be used as the resin for the conductive resin layer. Among others, the epoxy resin having excellent heat resistance, moisture resistance, adhesion, and the like is one of the most suitable resins.

The resin included in the conductive resin layer is preferably included, for example, in an amount greater than or equal to about 25 vol % and less than or equal to about 65 vol % with respect to the volume of the entire conductive resin.

The conductive resin layer preferably includes a curing agent together with the thermosetting resin. When the epoxy resin is used as the base resin, various known compounds such as, for example, phenol-based, amine-based, acid anhydride-based, imidazole-based, active ester-based, and amide-imide-based compounds can be used as the curing agent of the epoxy resin.

The conductive resin layer may include a plurality of layers.

The thickness of the conductive resin layer located at the central portion in height direction x of multilayer body 12 located at first end surface 12e and second end surface 12f is preferably, for example, greater than or equal to about 10 μm and less than or equal to about 150 μm.

When the conductive resin layer is also provided on first main surface 12a and second main surface 12b, and first side surface 12c and second side surface 12d, the thickness of the conductive resin layer at the central portion in length direction z of the conductive resin layer located on first main plane 12a and second main plane 12b, and first side surface 12c and second side surface 12d is preferably, for example, greater than or equal to about 10 μm and less than or equal to about 150 μm.

The thin film layer is formed by a thin film forming method such as, for example, a sputtering method or a vapor deposition method, and is a layer having the thickness less than or equal to about 1 μm on which the metal particle is deposited.

Plating Layer

Plating layer 34 includes a first plating layer 34a and a second plating layer 34b.

With reference to FIGS. 2 and 4, first plating layer 34a and second plating layer 34b, which are the plating layers 34 that can be disposed on ground electrode layer 32, will be described.

For example, first plating layer 34a and second plating layer 34b include at least one selected from Cu, Ni, Sn, Ag, Pd, an Ag—Pd alloy, Au, and the like.

First plating layer 34a covers first ground electrode layer 32a.

Second plating layer 34b covers second ground electrode layer 32b.

First plating layer 34a and second plating layer 34b may include a plurality of layers. In this case, for example, plating layer 34 preferably has a two-layer structure including a lower plating layer formed by Ni plating on ground electrode layer 32 and an upper plating layer formed by Sn plating on the lower plating layer.

That is, first plating layer 34a includes a first lower plating layer and a first upper plating layer located on the surface of the first lower plating layer.

Second plating layer 34b includes a second lower plating layer and a second upper plating layer located on the surface of the second lower plating layer.

The lower plating layer by the Ni plating is used to prevent ground electrode layer 32 from being eroded by solder in mounting multilayer ceramic capacitor 10, and the upper plating layer by the Sn plating is used such that wettability of the solder can be improved to easily mount multilayer ceramic capacitor 10.

The thickness per plating layer is preferably, for example, greater than or equal to about 2.0 μm and less than or equal to about 15.0 μm.

External electrode 30 may include only the plating layer without providing ground electrode layer 32.

Although not illustrated, a structure in which the plating layer is provided without providing ground electrode layer 32 will be described below.

In each of first external electrode 30a and second external electrode 30b, the plating layer may be directly provided on the surface of a ceramic element without providing the ground electrode layer. That is, multilayer ceramic capacitor 10 may have a structure including the plating layer electrically connected to first internal electrode layer 16a and second internal electrode layer 16b. In such a case, the plating layer may be formed after a catalyst is disposed on the surface of multilayer body 12 as pretreatment.

When the plating layer is directly provided on the multilayer body without providing the ground electrode layer, the reduced thickness of ground electrode layer can be converted into a low-height, namely, thinned multilayer body, or converted into the thickness of the multilayer body, namely, the thickness of effective layer portion, so that the degree of freedom in designing the multilayer body 12 can be improved.

The plating layer preferably includes a lower plating electrode provided on the surface of multilayer body 12 and an upper plating electrode provided on the surface of the lower plating electrode. For example, each of the lower plating electrode and the upper plating electrode preferably includes at least one metal selected from Cu, Ni, Sn, Pb, Au, Ag, Pd, Bi, Zn, or the like, or an alloy including the metal.

Furthermore, for example, the lower plating electrode is preferably formed using Ni having solder barrier performance, and the upper plating electrode is preferably formed using Sn or Au having good solder wettability.

For example, when first internal electrode layer 16a and second internal electrode layer 16b are formed using Ni, the lower plating electrode is preferably formed using Cu having good bondability with Ni. The upper plating electrode may be formed as necessary, and each of first external electrode 30a and second external electrode 30b may include only the lower plating electrode. As the plating layer, the upper plating electrode may be used as the outermost layer, or another plating electrode may be further provided on the surface of the upper plating electrode.

At this point, when external electrode 30 includes only the plating layer without providing ground electrode layer 32, the thickness per layer of the plating layer disposed without providing ground electrode layer 32 is preferably, for example, greater than or equal to about 1.0 μm and less than or equal to about 15.0 μm.

Furthermore, the plating layer preferably does not include glass. The metal ratio per unit volume of the plating layer is preferably, for example, greater than or equal to about 99 vol %.

The dimension in length direction z of multilayer ceramic capacitor 10 including multilayer body 12, first external electrode 30a, and second external electrode 30b is defined as an L dimension, the dimension in height direction x of multilayer ceramic capacitor 10 including multilayer body 12, first external electrode 30a, and second external electrode 30b is defined as a T dimension, and the dimension in width direction y of multilayer ceramic capacitor 10 including multilayer body 12, first external electrode 30a, and second external electrode 30b is defined as a W dimension.

The dimensions of multilayer ceramic capacitor 10 are not particularly limited, but, for example, the L dimension in length direction z is greater than or equal to about 0.2 mm and less than or equal to about 3.8 mm, the W dimension in width direction y is greater than or equal to about 0.1 mm and less than or equal to about 2.8 mm, and the T dimension in the height direction x is greater than or equal to about 0.1 mm and less than or equal to about 2.8 mm. The L dimension in length direction z is not necessarily longer than the W dimension in width direction y. The dimensions of multilayer ceramic capacitor 10 can be measured with a microscope.

In multilayer ceramic capacitor 10 of FIG. 1, coverage A of internal electrode layer 16 with respect to dielectric layer 14 located in outer effective layer portion 18a is larger than coverage B of internal electrode layer 16 with respect to dielectric layer 14 located in inner effective layer portion 18b. Thus, multilayer ceramic capacitor 10 has a structure in which the coverage of internal electrode layer 16 with respect to dielectric layer 14 is larger in outer effective layer portion 18a of effective layer portion 18 into which the moisture or the like easily infiltrates than in inner effective layer portion 18b. Accordingly, the interrupted gap of the internal electrode layer defining and functioning as the moisture infiltration path can be reduced, so that the infiltration of the moisture into multilayer body 12 can be reduced or prevented. As a result, the moisture resistance reliability of multilayer ceramic capacitor 10 can be improved. In outer effective layer portion 18a of effective layer portion 18, the coverage of internal electrode layer 16 with respect to dielectric layer 14 is large, so that the effective area can be improved to improve the acquired electrostatic capacitance of multilayer ceramic capacitor 10.

In multilayer ceramic capacitor 10 of FIG. 1, coverage B of internal electrode layer 16 with respect to dielectric layer 14 located in inner effective layer portion 18b is smaller than coverage A of internal electrode layer 16 with respect to dielectric layer 14 located in outer effective layer portion 18a. Accordingly, in inner effective layer portion 18b, the adhesion between dielectric layer 14 exposed without being covered with internal electrode layer 16 and dielectric layer 14 to be laminated thereon is improved, and the bonding force between dielectric layers 14 can be enhanced. As a result, the advantageous effects can also be exerted on the problem of peeling that can be generated between dielectric layer 14 and internal electrode layer 16.

2. Method for Manufacturing Multilayer Ceramic Capacitor

A non-limiting example of a method for manufacturing the multilayer ceramic capacitor of the present invention will be described below.

First, a dielectric sheet for a dielectric layer and conductive paste for an internal electrode layer are prepared. The dielectric sheet and the conductive paste for the internal electrode layer include a binder and a solvent. The binder and the solvent may be known.

Then, the conductive paste for the internal electrode layer is printed on the dielectric sheet in a predetermined pattern by, for example, screen printing or gravure printing. Thus, the dielectric sheet on which the pattern of the first internal electrode layer is formed and the dielectric sheet on which the pattern of the second internal electrode layer is formed are prepared.

Furthermore, regarding the dielectric sheet, a dielectric sheet for an outer layer on which a pattern of an internal electrode layer is not printed is also prepared.

When the conductive paste for the internal electrode layer is printed on the dielectric sheet, the conductive paste for the internal electrode layer is separately applied to the first internal electrode layer and the second internal electrode layer located in the outer effective layer portion and the inner effective layer portion in the effective layer of the multilayer body, such that the coverage of the internal electrode layer with respect to the dielectric layer located in the outer effective layer portion and the inner effective layer portion can be controlled.

Specifically, for example, the conductive paste of the first internal electrode layer and the second internal electrode layer with respect to the dielectric layer located in the outer effective layer portion and the conductive paste of the first internal electrode layer and the second internal electrode layer with respect to the dielectric layer located in the inner effective layer portion, which are used at this time, can be controlled by adjusting the amount of metal in each of the conductive pastes and the particle size of the metal in the conductive paste to make the coverage of the internal electrode layer with respect to the dielectric layer different.

Subsequently, a predetermined number of dielectric sheets for outer layers on which the pattern of the internal electrode layer is not printed are laminated to form a portion that becomes the second main surface-side outer layer on the second main plane side. Then, the dielectric sheet on which the pattern of the first internal electrode layer is printed and the dielectric sheet on which the pattern of the second internal electrode layer is printed are sequentially laminated on the portion that becomes the second main surface-side outer layer so as to have the structure of the present preferred embodiment, thus forming the portion including the effective layer portion. The portion that becomes the first main surface-side outer layer on the first main surface side is formed by laminating the predetermined number of dielectric sheets for the outer layers on which the pattern of the internal electrode layer is not printed on the portion including the effective layer portion. Thus, a multilayer sheet is prepared.

Subsequently, the multilayer sheet is pressed in a multilayer direction by, for example, isostatic pressing to prepare a multilayer block.

Then, the multilayer block is cut into a predetermined size to cut out a multilayer chip. At this point, the corner and the ridge of the multilayer chip may be rounded by barrel polishing or the like.

Subsequently, the multilayer chip is baked to produce multilayer body 12. The process of firing the multilayer chip includes, for example, a calcining process and a firing process.

In the calcining process, first, the multilayer chip is placed on a firing setter, and the binder included in the multilayer chip is heated and removed. Here, the organic binder contained in the dielectric sheet of the multilayer chip and the conductive paste for the internal electrode is removed. The calcination temperature at this time is preferably, for example, greater than or equal to about 150° C. and less than or equal to about 400° C.

Subsequently, in the main firing process, the multilayer chips placed on the calcined setter are put in a firing furnace, and firing is performed with the temperature in the furnace set to, for example, greater than or equal to about 600° C. and less than or equal to about 1400° C. In the furnace, gas amounts of $N_2$, $H_2$, $H_2O$, and the like are adjusted. Thus, the multilayer body can be obtained. At this point, more delicate control obtaining the coverage of the dielectric layer of the present preferred embodiment can be performed by adjusting the amount of gas in the furnace.

Case of Baked Layer

Subsequently, the conductive paste that becomes the ground electrode layer is applied to the first end surface and the second end surface of the multilayer body to form the ground electrode layer. When the baked layer is formed as the ground electrode layer, the conductive paste including the glass component and the metal component is applied by a method such as, for example, dipping, and then a baking treatment is performed to form the ground electrode layer. The temperature of the baking treatment at this time is preferably, for example, greater than or equal to about 700° C. and less than or equal to about 900° C.

When the ground electrode layer is formed of a baked layer, the baked layer may include the ceramic component.

In this case, the ceramic component may be included instead of the glass component, or both of them may be included.

For example, the ceramic component is preferably the same type of ceramic material as the multilayer body. When the ceramic component is included in the baked layer, preferably the conductive paste is applied to the multilayer chip before firing, and the multilayer chip before firing and the conductive paste applied to the multilayer chip before firing are simultaneously baked (fired) to form the multilayer body on which the baked layer is formed. The temperature (firing temperature) of the baking treatment at this time is preferably, for example, greater than or equal to about 900° C. and less than or equal to about 1400° C.

Case of Conductive Resin Layer

When the conductive resin layer is provided in the external electrode, the conductive resin layer is formed as follows.

The conductive resin layer may be formed on the baked layer as the ground electrode layer, or the conductive resin layer may be directly formed alone on multilayer body without forming the baked layer.

As a method for forming the conductive resin layer, for example, the conductive resin paste including the resin component and the metal component is prepared, and applied onto the ground electrode layer using a dipping method. Thereafter, heat treatment is performed at, for example, a temperature greater than or equal to about 250° C. and less than or equal to about 550° C. to thermally cure the resin, thus forming the conductive electrode layer.

An atmosphere during the heat treatment at this time is preferably, for example, an $N_2$ atmosphere.

In addition, in order to prevent scattering of the resin and to prevent oxidation of various metal components, an oxygen concentration is preferably, for example, reduced to less than or equal to about 100 ppm.

Case of Thin Film Layer

When the ground electrode layer is formed as a thin film layer, the ground electrode layer can be formed by a thin film forming method such as, for example, a sputtering method or an evaporation method. The ground electrode layer formed of the thin film layer is a layer having a thickness of, for example, less than or equal to about 1 μm on which metal particles are deposited.

Case of Plated Electrode

Furthermore, a plating electrode may be provided as the ground electrode layer on the exposed portion of the internal electrode layer of the multilayer body without providing the ground electrode layer. In this case, it can be formed by the following method.

That is, the plating treatment is applied to the first end surface and the second end surface of the multilayer body to form the lower plating electrode on the exposed portion of the internal electrode layer. In performing the plating processing, for example, either electrolytic plating or electroless plating may be adopted, but the electroless plating requires the pretreatment with a catalyst or the like in order to improve a plating deposition rate, and has a disadvantage that the process becomes complicated. Accordingly, usually the electrolytic plating is preferably used. Barrel plating is preferably used as the plating method. As required, the upper plating electrode formed on the surface of the lower plating electrode may be formed similarly.

Subsequently, the plating layer is formed on the surface of the ground electrode layer, the surface of the conductive resin layer, the surface of the lower plating electrode, and the surface of the upper plating electrode. More particularly, for example, in multilayer ceramic capacitor 10 of FIG. 1, a Sn plating layer is formed on the Ni plating layer and the Ni plating layer on the ground electrode layer by the baked layer. For example, the Ni plating layer and the Sn plating layer are sequentially formed by the barrel plating method.

As described above, multilayer ceramic capacitor 10 of the present preferred embodiment is manufactured.

3. Experimental Example

Subsequently, in order to check the advantageous effects of the multilayer ceramic capacitor of the preferred embodiment described above, the multilayer ceramic capacitor was manufactured as a sample with different conditions, and a moisture resistance test, measurement of the electrostatic capacitance, and checking of the presence or absence of structural defects were performed for each sample.

(1) Specification of Each Sample According to Experimental Example

First, the multilayer ceramic capacitors of an experimental example of a preferred embodiment of the present invention having the following specifications were prepared according to the method for manufacturing the multilayer ceramic capacitor described above. The sample of each sample number is obtained by changing coverage A of the internal electrode layer with respect to the dielectric layer located in the outer effective layer portion and coverage B of the internal electrode layer with respect to the dielectric layer located in the inner effective layer portion.

Dimensions of multilayer ceramic capacitor: L×W×T (including design value)=about 1.2 mm×about 0.7 mm×about 0.7

Material of dielectric layer: $BaTiO_3$

Capacity: See Table 1

Rated voltage: about 6.3V

Material of internal electrode: Ni

Coverage A of the internal electrode layer with respect to the dielectric layer located in the outer effective layer portion: See Table 1

Coverage B of internal electrode layer with respect to dielectric layer located in inner effective layer portion: See Table 1

Structure of External Electrode

Ground Electrode Layer: Baked Layer Containing Conductive Metal (Cu) and Glass Component Thickness of ground electrode layer: Thickness at central portion in height direction located at first end surface and second end surface in section of multilayer body at position of ½W: about 45 μm Thickness at central portion in length direction located on first main surface and second main surface in section of multilayer body at position of ½W: about 2 μm Thickness at center portion in width direction located on first side surface and second side surface in section of multilayer body at position of ½T: about 2 μm Plating layer: Two-layer structure of Ni plating layer and Sn plating layer Thickness of Ni plating layer: Thickness at central portion in height direction located at first end surface and second end surface in section of multilayer body at position of ½W: about 3 μm Thickness at central portion in length direction located on first main surface and second main surface in section of multilayer body at position of ½W: about 2 μm Thickness at center portion in width direction located on first side surface and second side surface in section of multilayer body at position of ½T: about 2 μm Thickness of Sn plating layer: Thickness at central portion in height direction located at first end surface and second end surface in section of multilayer body at position of ½W: about 3 μm Thickness at central portion in length direction located on first main surface and second main surface in section of multilayer body at position of ½W: about 2 μm Thickness at center portion in width direction located on first side surface and second side surface in section of multilayer body at position of ½T: about 2 μm (2) Moisture Resistance Test Method The moisture resistance test was performed on each sample based on the PCBT test method. More specifically, first, each sample was mounted on a wiring board using eutectic solder. Subsequently, the insulation resistance value of each sample was measured. Subsequently, the wiring substrate was placed in a high temperature and high humidity bath, and a direct current of about 2 V was applied between the pair of external electrodes for each sample under an environment of about 125° C. and a relative humidity of about 95% RH, and maintained for about 72 hours. Subsequently, the insulation resistance value of each sample after the moisture resistance test was measured.

For each sample, the insulation resistance values before the moisture resistance test and after the test were compared, and the sample in which the insulation resistance value did not decrease by at least two digits was determined as "o", the sample in which the insulation resistance value did not decrease by at least four digits was determined as "Δ", and the sample in which the insulation resistance value decreased by at least four digits was determined as "×". The moisture resistance test was performed by preparing twenty samples for the samples of each sample number.

(3) Measurement of Electrostatic Capacitance

The capacitance was measured using an electrostatic capacitance measuring device (LCR meter) under a measurement condition based on a standard specification (JIS C 5101-1: 2010). Here, a sample having the electrostatic capacitance less than or equal to about 9.0 μF and greater than or equal to 12 μF was determined as "x", a sample having the electrostatic capacitance of more than about 9.0 μF and less than or equal to about 9.5 μF and a sample having the electrostatic capacitance greater than or equal to about 11.0 μF and less than or equal to about 12 μF was determined as "Δ", and a sample having the electrostatic capacitance more than about 9.5 μF and less than about 11.0 μF was determined as "○".

(4) Method for Checking Structural Defect (Peeling Between Dielectric Layer and Internal Electrode Layer The presence or absence of the structural defects due to the peeling between the dielectric layer and the internal electrode layer was checked using an ultrasonic flaw detection test. First, the multilayer ceramic capacitors that are the samples were aligned such that the lamination direction of the internal electrode layers faced upward. Next, the upper surfaces of the aligned multilayer ceramic capacitors were irradiated with ultrasonic waves using an ultrasonic probe and scanned. By observing the reflected wave of the ultrasonic wave to detect the reflected wave returning earlier than the bottom surface wave, the presence or absence of the peeling was checked between the dielectric layer and the internal electrode layer. When the number of peeling was greater than or equal to ten in twenty, it was determined as "×", when the number of peeling was greater than or equal to one and less than ten in twenty, it was determined as "Δ", and when the number of peeling was zero in twenty, it was determined as "○". The structural defect was checked by preparing twenty samples for the sample of each sample number.

In the comprehensive determination for each sample, in the humidity resistance test, the measurement result of the electrostatic capacitance, and the checking result of the presence or absence of the structural defect described above, when there was even one "×", it was determined as "×", when there was no "×" while there was "Δ", it was determined as "○", and when all the test results were "○", it was determined as "⊙".

The evaluation result is illustrated in Table 1.

respect to the dielectric layer located in the inner effective layer portion was larger than about 80%, so that the structural defect determination was "×", and thus the sample was determined as "×" in the comprehensive determination.

In the sample of sample number 3, coverage A of the internal electrode layer with respect to the dielectric layer located in the outer effective layer portion was larger than coverage B of the internal electrode layer with respect to the dielectric layer located in the inner effective layer portion, coverage A of the internal electrode layer with respect to the dielectric layer located in the outer effective layer portion was smaller than about 85%, and coverage B of the internal

TABLE 1

| Sample number | 1 | 2 | 3 | 4 | 5 | 6 | 7 | 8 | 9 | 10 | 11 | 12 | 13 |
|---|---|---|---|---|---|---|---|---|---|---|---|---|---|
| Coverage A of outer effective layer portion (%) | 65 | 65 | 70 | 80 | 85 | 90 | 100 | 95 | 95 | 95 | 95 | 100 | 95 |
| Coverage B of inner effective layer portion (%) | 65 | 70 | 65 | 70 | 70 | 70 | 70 | 60 | 70 | 80 | 90 | 95 | 95 |
| Moisture resistance test (pieces) | 18/20 | 16/20 | 4/20 | 1/20 | 0/20 | 0/20 | 0/20 | 0/20 | 0/20 | 0/20 | 0/20 | 0/20 | 0/20 |
| Moisture resistance test determination | X | X | Δ | Δ | ○ | ○ | ○ | ○ | ○ | ○ | ○ | ○ | ○ |
| Electrostatic Capacity (μF) | 9.4 | 9.6 | 9.5 | 9.8 | 9.9 | 9.9 | 10.0 | 9.5 | 10.0 | 10.4 | 10.9 | 11.2 | 11.2 |
| Electrostatic capacity determination | Δ | ○ | Δ | ○ | ○ | ○ | ○ | Δ | ○ | ○ | ○ | Δ | Δ |
| Checking of presence or absence of structural defect (pieces) | 0/20 | 0/20 | 0/20 | 0/20 | 0/20 | 0/20 | 0/20 | 0/20 | 0/20 | 0/20 | 1/20 | 3/20 | 12/20 |
| Structural defect determination | ○ | ○ | ○ | ○ | ○ | ○ | ○ | ○ | ○ | ○ | Δ | Δ | X |
| Comprehensive determination | X | X | ○ | ○ | ⊙ | ⊙ | ⊙ | ○ | ⊙ | ⊙ | ○ | ○ | X |

(4) Experimental Results

According to Table 1, in the sample of sample number 1, coverage A of the internal electrode layer with respect to the dielectric layer located in the outer effective layer portion and coverage B of the internal electrode layer with respect to the dielectric layer located in the inner effective layer portion were the same, coverage A of the internal electrode layer with respect to the dielectric layer located in the outer effective layer portion was less than about 80%, and coverage B of the internal electrode layer with respect to the dielectric layer located in the inner effective layer portion was less than about 70%, so that the determination in the moisture resistance test was "×", and thus the sample was determined as "×" in the comprehensive determination.

In the sample of sample number 2, coverage A of the internal electrode layer with respect to the dielectric layer located in the outer effective layer portion was smaller than coverage B of the internal electrode layer with respect to the dielectric layer located in the inner effective layer portion, and coverage A of the internal electrode layer with respect to the dielectric layer located in the outer effective layer portion was smaller than about 85%, so that the moisture resistance test determination was "×", and thus the sample was determined as "×" in the comprehensive determination.

In the sample of sample number 13, coverage A of the internal electrode layer with respect to the dielectric layer located in the outer effective layer portion and coverage B of the internal electrode layer with respect to the dielectric layer located in the inner effective layer portion were the same, and coverage B of the internal electrode layer with respect to the dielectric layer located in the inner effective layer portion was smaller than about 70%, so that the moisture resistance test determination was "Δ" and the sample was determined as "Δ", and thus the sample was determined as "○" in the comprehensive determination.

In the sample of sample number 4, coverage A of the internal electrode layer with respect to the dielectric layer located in the outer effective layer portion was larger than coverage B of the internal electrode layer with respect to the dielectric layer located in the inner effective layer portion, and coverage A of the internal electrode layer with respect to the dielectric layer located in the outer effective layer portion was smaller than about 85%, so that the moisture resistance test determination was "Δ", and thus the sample was determined as "○" in the comprehensive determination.

In the sample of sample number 8, coverage A of the internal electrode layer with respect to the dielectric layer located in the outer effective layer portion was larger than coverage B of the internal electrode layer with respect to the dielectric layer located in the inner effective layer portion, and coverage B of the internal electrode layer with respect to the dielectric layer located in the inner effective layer portion was smaller than about 70%, so that the electrostatic capacitance determination was "Δ", and thus the sample was determined as "○" in the comprehensive determination.

In the samples of sample numbers 11 and 12, coverage A of the internal electrode layer with respect to the dielectric layer located in the outer effective layer portion was larger than coverage B of the internal electrode layer with respect to the dielectric layer located in the inner effective layer portion, and coverage B of the internal electrode layer with respect to the dielectric layer located in the inner effective layer portion was larger than about 80%, so that the structural defect determination was "Δ", and thus the sample was determined as "○" in the comprehensive determination.

In the samples of sample numbers 5, 7, 9, and 10, coverage A of the internal electrode layer with respect to the dielectric layer located in the outer effective layer portion was larger than coverage B of the internal electrode layer with respect to the dielectric layer located in the inner effective layer portion, coverage A of the internal electrode layer with respect to the dielectric layer located in the outer effective layer portion was greater than or equal to about 85% and less than or equal to 100%, and coverage B of the internal electrode layer with respect to the dielectric layer located in the inner effective layer portion was greater than or equal to about 70% and less than or equal to about 80%, so that any of the moisture resistance test determination, the electrostatic capacitance determination, and the structural defect determination was "○", and thus the sample was determined as "⊙" in the comprehensive determination.

As described above, coverage A of the internal electrode layer with respect to the dielectric layer located in the outer effective layer portion of the effective layer portion into which moisture or the like easily infiltrates is larger than coverage B of the internal electrode layer with respect to the dielectric layer located in the inner effective layer portion, so that the interrupted gap of the internal electrode layer defining and functioning as the moisture infiltration path can be reduced, and thus the infiltration of the moisture into the multilayer body can be reduced or prevented. As a result, it has become clear that the moisture resistance reliability of the multilayer ceramic capacitor having the above configuration can be improved.

In addition, in the outer effective layer portion of the effective layer portion, because the structure has a large coverage of the internal electrode layer with respect to the dielectric layer, it has become clear that the effective area is improved, and the acquired electrostatic capacitance of the multilayer ceramic capacitor can be improved.

As described above, preferred embodiments of the present invention are disclosed in the above description, but the present invention is not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of laminated dielectric layers, a first main surface and a second main surface facing each other in a height direction, a first end surface and a second end surface facing each other in a length direction orthogonal or substantially orthogonal to the height direction, and a first side surface and a second side surface facing each other in a width direction orthogonal or substantially orthogonal to the height direction and the length direction;
    a plurality of first internal electrode layers on the plurality of dielectric layers and exposed to the first end surface;
    a plurality of second internal electrode layers on the plurality of dielectric layers and exposed to the second end surface;
    a first external electrode on the first end surface; and
    a second external electrode on the second end surface; wherein
    the multilayer body includes an effective layer portion in which the first internal electrode layer and the second internal electrode layer are opposite to each other;
    the effective layer portion includes an inner effective layer portion and an outer effective layer portion when viewed from the first end surface or the second end surface;
    the outer effective layer portion is located on sides of the first main surface, the second main surface, the first side surface, and the second side surface of the effective layer portion, and the inner effective layer portion is located inside the outer effective layer portion; and
    a coverage over an entirety of the first internal electrode layer and the second internal electrode layer with respect to the dielectric layer located in the outer effective layer portion is larger than a coverage of at least a center portion in the width direction of the first internal electrode layer and the second internal electrode layer with respect to the dielectric layer located in the inner effective layer portion.

2. The multilayer ceramic capacitor according to claim 1, wherein
    the coverage of the first internal electrode layer and the second internal electrode layer with respect to the dielectric layer in the outer effective layer portion is greater than or equal to about 85% and less than or equal to about 100%; and
    the coverage of the first internal electrode layer and the second internal electrode layer with respect to the dielectric layer in the inner effective layer portion is greater than or equal to about 70% and less than or equal to about 80%.

3. The multilayer ceramic capacitor according to claim 1, wherein the outer effective layer portion extends inward by about 20 μm from an edge of the effective layer portion.

4. The multilayer ceramic capacitor according to claim 1, wherein a number of the plurality of dielectric layers is greater than or equal to ten and less than or equal to one thousand five hundred.

5. The multilayer ceramic capacitor according to claim 1, wherein each of the plurality of dielectric layers includes a ceramic material including $BaTiO_3$, $CaTiO_3$, $SrTiO_3$, or $CaZrO_3$ as a main component.

6. The multilayer ceramic capacitor according to claim 5, wherein each of the plurality of dielectric layers includes an Mn compound, an Fe compound, a Cr compound, a Co compound, or an Ni compound as an accessory component having a content smaller than the main component.

7. The multilayer ceramic capacitor according to claim 1, wherein a thickness of each of the plurality of dielectric layers is greater than or equal to about 0.4 μm and less than or equal to about 10.0 μm.

8. The multilayer ceramic capacitor according to claim 1, wherein each of the plurality of first and second internal electrode layers includes at least one of Ni, Cu, Ag, Pd, or Au, or an alloy including at least one of Ni, Cu, Ag, Pd, or Au.

9. The multilayer ceramic capacitor according to claim 1, wherein a thickness of each of the plurality of first and second internal electrode layers is greater than or equal to about 0.2 μm and less than or equal to about 5.0 μm.

10. The multilayer ceramic capacitor according to claim 1, wherein a number of each of the plurality of first and second internal electrode layers is greater than or equal to 10 and less than or equal to 1500.

11. The multilayer ceramic capacitor according to claim 1, wherein
the first external electrode includes a first ground electrode layer on the first end surface and a first plating layer on the first ground electrode layer; and
the second external electrode includes a second ground electrode layer on the second end surface and a second plating layer on the second ground electrode layer.

12. The multilayer ceramic capacitor according to claim 11, wherein
the first ground electrode layer extends from first end surface to portions of each of the first and second main surfaces and each of the first and second side surfaces; and
the second ground electrode layer extends from second end surface to portions of each of the first and second main surfaces and each of the first and second side surfaces.

13. The multilayer ceramic capacitor according to claim 11, wherein each of the first and second ground electrode layers includes at least one of a baked layer, a conductive resin layer, and a thin film layer.

14. The multilayer ceramic capacitor according to claim 11, wherein each of the first and second ground electrode layers includes a glass component and a metal component.

15. The multilayer ceramic capacitor according to claim 14, wherein the glass component includes at least one of B, Si, Ba, Mg, Al, or Li.

16. The multilayer ceramic capacitor according to claim 14, wherein the metal component includes at least one of Cu, Ni, Ag, Pd, an Ag—Pd alloy, or Au.

17. The multilayer ceramic capacitor according to claim 11, wherein each of the first and second plating layers includes a lower plating layer and an upper plating layer.

18. The multilayer ceramic capacitor according to claim 17, wherein the lower plating layer includes Sn and the upper plating layer includes Ni.

* * * * *